United States Patent
Azumi et al.

(10) Patent No.: US 9,746,956 B2
(45) Date of Patent: Aug. 29, 2017

(54) TOUCH DETECTOR AND METHOD OF DRIVING THE SAME, DISPLAY WITH TOUCH DETECTION FUNCTION, AND ELECTRONIC UNIT HAVING PLURAL DIFFERENT DRIVE ELECTRODES

(71) Applicant: Japan Display Inc., Tokyo (JP)

(72) Inventors: Kohei Azumi, Tokyo (JP); Yoshitoshi Kida, Kanagawa (JP); Koji Noguchi, Kanagawa (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/234,474

(22) Filed: Aug. 11, 2016

(65) Prior Publication Data

US 2016/0349911 A1 Dec. 1, 2016

Related U.S. Application Data

(63) Continuation of application No. 14/678,422, filed on Apr. 3, 2015, now Pat. No. 9,442,595, which is a
(Continued)

(30) Foreign Application Priority Data

Sep. 24, 2010 (JP) .................................. 2010-214188

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G06F 3/044* (2013.01);
(Continued)

(58) Field of Classification Search
CPC ................................ G06F 3/041–3/047; G06F 2203/041–2203/04113
See application file for complete search history.

(56) References Cited

U.S. PATENT DOCUMENTS

| 4,659,874 A | 4/1987 | Landmeier |
| 6,091,030 A | 7/2000 | Tagawa et al. |
(Continued)

FOREIGN PATENT DOCUMENTS

| CN | 201293982 Y | 8/2009 |
| CN | 101639750 A | 2/2010 |
(Continued)

OTHER PUBLICATIONS

Japanese Office Action issued Dec. 3, 2013 for corresponding Japanese Application No. 2010-214188.
(Continued)

*Primary Examiner* — William Boddie
*Assistant Examiner* — Andrew Schnirel
(74) *Attorney, Agent, or Firm* — Michael Best & Friedrich LLP

(57) ABSTRACT

A touch detector capable of achieving high position resolution while improving detection sensitivity to a touch is provided. The touch detector includes: a plurality of drive electrodes arranged side by side to extend in one direction; a detection electrode extending in a direction orthogonal to a direction where the drive electrodes extend, and arranged to form a capacitance at each of intersections with the drive electrodes; and a scanning drive section sequentially selecting a predetermined plural number of target electrodes from the plurality of drive electrodes in a time-divisional manner, and applying a touch detection drive signal with a plurality of pulse waveforms for detecting an external adjacent object to the selected target electrodes to perform a scanning drive.
(Continued)

A scanning pitch in the scanning drive is smaller than the total width of the plural number of selected target electrodes.

7 Claims, 15 Drawing Sheets

Related U.S. Application Data continuation of application No. 13/137,340, filed on Aug. 8, 2011, now Pat. No. 9,035,900.

(51) Int. Cl.
<table>
<tr><td>G02F 1/1333</td><td>(2006.01)</td></tr>
<tr><td>G02F 1/1335</td><td>(2006.01)</td></tr>
<tr><td>G02F 1/1343</td><td>(2006.01)</td></tr>
<tr><td>G02F 1/1368</td><td>(2006.01)</td></tr>
</table>

(52) U.S. Cl.
CPC .......... *G06F 3/0412* (2013.01); *G02F 1/1368* (2013.01); *G02F 1/13439* (2013.01); *G02F 1/133514* (2013.01); *G02F 1/133528* (2013.01); *G02F 1/134336* (2013.01); *G02F 2001/133302* (2013.01); *G02F 2201/123* (2013.01); *G06F 2203/04112* (2013.01)

(56) References Cited

U.S. PATENT DOCUMENTS

<table>
<tr><td>6,222,522</td><td>B1</td><td>4/2001</td><td>Mathews et al.</td></tr>
<tr><td>6,288,707</td><td>B1</td><td>9/2001</td><td>Philipp</td></tr>
<tr><td>6,535,200</td><td>B2</td><td>3/2003</td><td>Philipp</td></tr>
<tr><td>9,377,905</td><td>B1 *</td><td>6/2016</td><td>Grivna .................... G06F 3/044<br>345/173</td></tr>
<tr><td>2004/0003949</td><td>A1</td><td>1/2004</td><td>Lin</td></tr>
<tr><td>2007/0074914</td><td>A1</td><td>4/2007</td><td>Geaghan et al.</td></tr>
<tr><td>2007/0229468</td><td>A1</td><td>10/2007</td><td>Peng et al.</td></tr>
<tr><td>2007/0279395</td><td>A1</td><td>12/2007</td><td>Philipp et al.</td></tr>
<tr><td>2008/0158167</td><td>A1</td><td>7/2008</td><td>Hotelling et al.</td></tr>
<tr><td>2008/0246496</td><td>A1</td><td>10/2008</td><td>Hristov et al.</td></tr>
<tr><td>2009/0066665</td><td>A1</td><td>3/2009</td><td>Lee</td></tr>
<tr><td>2009/0256818</td><td>A1</td><td>10/2009</td><td>Noguchi et al.</td></tr>
<tr><td>2009/0283340</td><td>A1</td><td>11/2009</td><td>Liu et al.</td></tr>
<tr><td>2010/0026660</td><td>A1</td><td>2/2010</td><td>Kitamura</td></tr>
<tr><td>2010/0066692</td><td>A1</td><td>3/2010</td><td>Noguchi et al.</td></tr>
<tr><td>2010/0085324</td><td>A1</td><td>4/2010</td><td>Noguchi et al.</td></tr>
<tr><td>2010/0182273</td><td>A1</td><td>7/2010</td><td>Noguchi et al.</td></tr>
<tr><td>2011/0310025</td><td>A1</td><td>12/2011</td><td>Simmons</td></tr>
<tr><td>2012/0050216</td><td>A1</td><td>3/2012</td><td>Kremin et al.</td></tr>
</table>

FOREIGN PATENT DOCUMENTS

<table>
<tr><td>CN</td><td>101719344 A</td><td>6/2010</td></tr>
<tr><td>JP</td><td>05-274084</td><td>10/1993</td></tr>
<tr><td>JP</td><td>10-143323</td><td>5/1998</td></tr>
<tr><td>JP</td><td>2004-038919 A</td><td>2/2004</td></tr>
<tr><td>JP</td><td>2009-244958</td><td>10/2009</td></tr>
<tr><td>JP</td><td>2010-039602 A</td><td>2/2010</td></tr>
<tr><td>JP</td><td>2010-072743 A</td><td>4/2010</td></tr>
<tr><td>JP</td><td>2010-092275 A</td><td>4/2010</td></tr>
<tr><td>TW</td><td>200947030 A</td><td>11/2009</td></tr>
<tr><td>WO</td><td>WO-2008/085719 A2</td><td>7/2008</td></tr>
</table>

OTHER PUBLICATIONS

Taiwanese Office Action issued Jul. 24, 2014 for corresponding Taiwanese Application No. 100126471.

Chinese Office Action issued Jan. 7, 2015 for corresponding Chinese Application No. 201110275017.4.

* cited by examiner

TOUCH DETECTOR AND METHOD OF DRIVING THE SAME, DISPLAY WITH TOUCH DETECTION FUNCTION, AND ELECTRONIC UNIT HAVING PLURAL DIFFERENT DRIVE ELECTRODES

CROSS REFERENCES TO RELATED APPLICATIONS

The present invention is a Continuation of application Ser. No. 14/678,422, filed on Apr. 3, 2015, which is a Continuation of application Ser. No. 13/137,340, filed on Aug. 8, 2011, now U.S. Pat. No. 9,035,900, issued on May 19, 2015, which claims priority to Japanese Patent Application Number 2010-214188, filed on Sep. 24, 2010, the entire contents of which are incorporated herein by reference.

BACKGROUND

The present technology relates to a touch detector, and more specifically relates to a touch detector detecting a touch based on a change in capacitance by an external adjacent object and a method of driving the same, a display with a touch detection function and an electronic unit including such a touch detector.

In recent years, attention has been given to a display capable of inputting information by a button image instead of a typical mechanical button by being provided with a contact detection device, that is, a so-called touch panel mounted on or integrated with a display such as a liquid crystal display and displaying various button images on the display. As a display including such a touch panel does not need an input device such as a keyboard, a mouse or a keypad, there is a tendency to expand the use of such a display to portable information terminals such as cellular phones in addition to computers.

Systems of touch detectors include an optical system, a resistance system and the like, but expectations are placed on a capacitance system touch detector which has a relatively simple configuration and is allowed to achieve low power consumption. For example, Japanese Unexamined Patent Application Publication No. 2009-244958 proposes a display in which a common electrode for display originally included in a display also serves as one (a drive electrode) of a pair of electrodes for touch sensor and the other (a touch detection electrode) is arranged to intersect the common electrode. A capacitance is formed between the drive electrode and the touch detection electrode, and the capacitance is changed by an external adjacent object. This display analyzes a touch detection signal obtained from the touch detection electrode when a drive signal is applied to the drive electrode to detect the external adjacent object with use of the change in the capacitance. In this display, while the drive signal is sequentially applied to the common electrode (drive electrode) to perform line-sequential scanning, thereby performing a display operation, the touch detection signal obtained from the touch detection electrode in response to the drive signal is analyzed to perform a touch detection operation.

SUMMARY

Important characteristics of a touch detector include detection sensitivity to a touch and position resolution for touch position detection. To improve detection sensitivity in a capacitance system touch detector, for example, a method of increasing the width of a drive electrode is considered. However, in this case, a scanning pitch in touch detection scanning is increased to cause rough scanning, and position resolution may be deteriorated accordingly.

It is desirable to provide a touch detector achieving high position resolution while improving detection sensitivity to a touch, and a method of driving the same, a display with a touch detection function, and an electronic unit.

According to an embodiment of the technology, there is provided a touch detector including: a plurality of drive electrodes, a detection electrode; and a scanning drive section. The plurality of drive electrodes are arranged side by side to extend in one direction. The detection electrode extends in a direction orthogonal to a direction where the drive electrodes extend, and is arranged to form a capacitance at each of intersections with the drive electrodes, The scanning drive section sequentially selects a predetermined plural number of target electrodes from the plurality of drive electrodes in a time-divisional manner, and applies a touch detection drive signal with a plurality of pulse waveforms for detecting an external adjacent object to the selected target electrodes to perform a scanning drive. A scanning pitch in the scanning drive is smaller than the total width of the plural number of selected target electrodes.

According to an embodiment of the technology, there is provided a method of driving a touch detector including: sequentially selecting a predetermined plural number of target electrodes from a plurality of drive electrodes, which is arranged side by side to extend in one direction, in a time-divisional manner, and applying a touch detection drive signal with a plurality of pulse waveforms for detecting an external adjacent object to the selected target electrodes to perform a scanning drive with a scanning pitch, the scanning pitch being smaller than the total width of the plural number of selected target electrodes; and detecting the external adjacent object based on a detection signal of a detection electrode which extends in a direction orthogonal to a direction where the drive electrodes extend and is arranged to form a capacitance at each of intersections with the drive electrodes.

According to an embodiment of the technology, there is provided a display with a touch detection function including: a plurality of drive electrodes, a detection electrode, a display element; and a scanning drive section. The plurality of drive electrodes are arranged side by side to extend in one direction. The detection electrode extends in a direction orthogonal to a direction where the drive electrodes extend and is arranged to form a capacitance at each of intersections with the drive electrodes. The display element performs display based on a pixel signal and a display drive signal. The scanning drive section performs a first scanning drive sequentially applying the display drive signal to the plurality of drive electrodes in a time-divisional manner, and a second scanning drive sequentially selecting a predetermined plural number of target electrodes from the plurality of drive electrodes in a time-divisional manner and applying a touch detection drive signal with a plurality of pulse waveforms for detecting an external adjacent object to the selected target electrodes. A scanning pitch in the second scanning drive is smaller than the total width of the plural number of selected target electrodes.

According to an embodiment of the technology, there is provided an electronic unit including the above-described touch detector, and corresponds to, for example, a television, a digital camera, a personal computer, a video camera or a portable terminal device such as a cellular phone.

In the touch detector, the method of driving a touch detector, the display with a touch detection function and the electronic unit according to the embodiment of the technology, the touch detection drive signal with a plurality of pulse waveforms is applied to the predetermined plural number of target electrodes sequentially selected in a time-divisional manner to perform a scanning drive for touch detection. The scanning drive is performed with a scanning pitch smaller than the total width of the plural number of selected target electrodes.

For example, the touch detector according to the embodiment of the technology preferably further includes a touch detection section sampling a detection signal of the detection electrode at timings according to transitions of the plurality of pulse waveforms of the drive signal to detect an external adjacent object. In this case, every time the scanning drive section drives the target electrodes, the touch detection section preferably completes detection of an external adjacent object in a region corresponding to the driven target electrodes, and the touch detection section preferably determines a touched position based on all detection results obtained from the target electrodes sequentially selected.

The drive electrodes are allowed to be configured by, for example, the following two methods.

For example, the plurality of drive electrodes may have equal widths. In this case, in the scanning drive, while the touch detection drive signal is simultaneously applied to the predetermined plural number of target electrodes, scanning is allowed to be performed to shift target electrodes by a number smaller than the predetermined plural number at a time.

Moreover, for example, the plurality of drive electrodes may include two kinds of drive electrodes with different widths, and the two kinds of drive electrodes may be alternately arranged side by side. In this case, in the scanning drive, while the touch detection drive signal is simultaneously applied to three adjacent target electrodes selected from the two kinds of drive electrodes which are alternately arranged side by side, scanning is allowed to be performed to shift target electrodes by two electrodes at a time.

In the touch detector and the method of driving a touch detector, the display with a touch detection function and the electronic unit according to the embodiment of the technology, the scanning pitch is smaller than the total width of the plural number of target electrodes; therefore, while improving detection sensitivity to a touch, high position resolution is achievable.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENTS

Preferred embodiments of the technology will be described in detail below referring to the accompanying drawings. Descriptions will be given in the following order.
1. Basic principle of capacitance system touch detection
2. First Embodiment (Touch detector)
3. Second Embodiment (Touch detector)
4. Third Embodiment (Display with touch detection function)
5. Application Examples 1. Basic Principle of Capacitance System Touch Detection First, referring to FIG. 1 to FIG. 3, a basic principle of touch detection by a touch detector according to an embodiment of the technology will be described below. This touch detection is embodied by a capacitance system touch sensor, and for example, as illustrated in a part A in FIG. 1, a capacitive element is configured of a pair of electrodes (a drive electrode E1 and a touch detection electrode E2) arranged to face each other with a dielectric D in between. Such a configuration is illustrated as an equivalent circuit illustrated in a part B in FIG. 1. A capacitive element C1 is configured of the drive electrode E1, the touch detection electrode E2 and the dielectric D. In the capacitive element C1, one end thereof is connected to an AC signal source (a drive signal source) S, and the other end P thereof is grounded through a resistor R and is connected to a voltage detector (a touch detection circuit) DET. When an AC rectangular wave Sg (refer to a part B in FIG. 3) with a predetermined frequency (for example, approximately a few kHz to ten-odd KHz) is applied from the AC signal source S to the drive electrode E1 (the one end of the capacitive element C1), an output waveform (a touch detection signal Vdet) as illustrated in a part A in FIG. 3 appears in the touch detection electrode E2 (the other end P of the capacitive element C1). In addition, the AC rectangular wave Sg corresponds to a touch detection drive signal Vcomt which will be described later.

Figure 1:
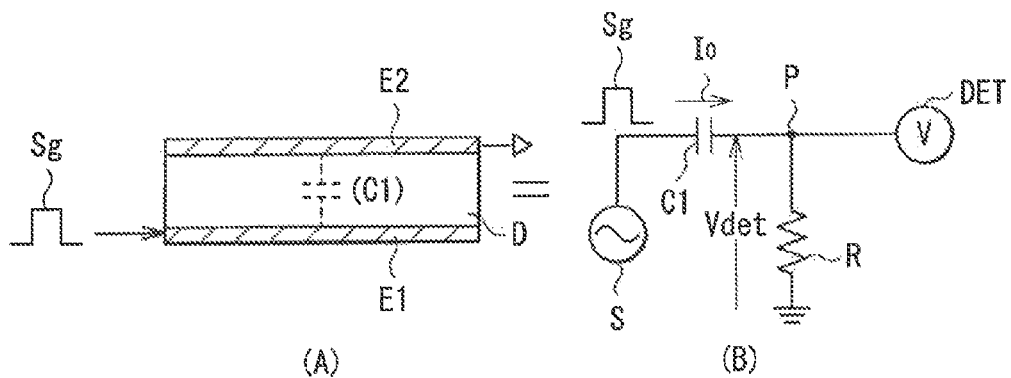
FIG. 1 is an illustration for describing a basic principle of a touch detection system in a touch detector according to an embodiment of the technology in a state where a finger does not touch or does not come close to the touch detector.

In a state where a finger does not touch (or come close to) the touch detection electrode E2, as illustrated in FIG. 1, a current $I_0$ according to the capacitance value of the capacitive element C1 flows during charging and discharging the capacitive element C1. A potential waveform at the other end P of the capacitive element C1 at this time is, for example, as illustrated by a waveform $V_0$ in the part A in FIG. 3, and the waveform $V_0$ is detected by the voltage detector DET.

Figure 2:
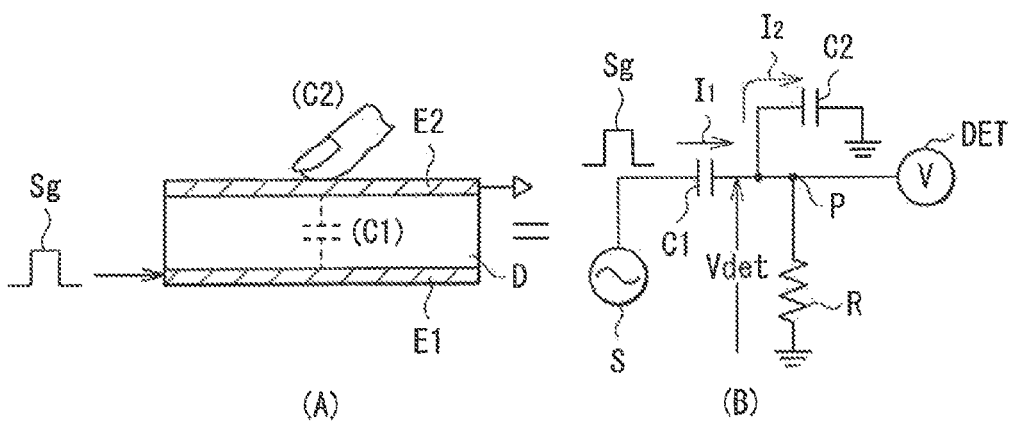
FIG. 2 is an illustration for describing the basic principle of the touch detection system in the touch detector according to the embodiment of the technology in a state where a finger touches or comes close to the touch detector.
Figure 3:
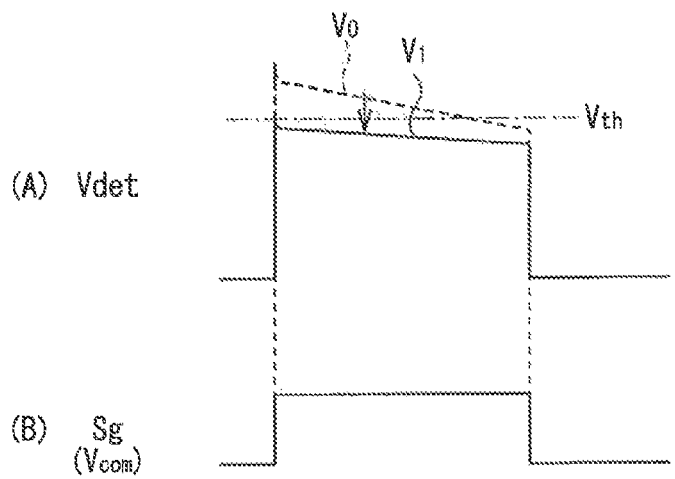
FIG. 3 is an illustration of an example of waveforms of a drive signal and a touch detection signal for describing the basic principle of the touch detection system in the touch detector according to the embodiment of the technology.

On the other hand, in a state where the finger touches (or comes close to) the touch detection electrode E2, as illustrated in FIG. 2, a capacitive element C2 formed by the finger is added to the capacitive element C1 in series. In this state, currents $I_1$ and $I_2$ flow during charging and discharging the capacitive elements C1 and C2, respectively. The potential waveform at the other end P of the capacitive element C1 at this time is, for example, as illustrated by a waveform $V_1$ in the part A in FIG. 3, and the waveform $V_1$ is detected by the voltage detector DET. At this time, the potential at a point P is a divided potential determined by the values of the current $I_1$ and $I_2$ flowing through the capacitive elements C1 and C2, respectively. Therefore, the waveform $V_1$ has a smaller value than that of the waveform $V_0$ in a non-touch state. The voltage detector DET compares a detected voltage with a predetermined threshold voltage $V_{th}$, and when the detected voltage is equal to or higher than the threshold voltage $V_{th}$, the voltage detector DET determines that the state is in a non-touch state, and when the detected voltage is smaller than the threshold voltage $V_{th}$, the voltage detector DET determines that the state is a touch state. Thus, touch detection is allowed in such a manner.

2. First Embodiment

Configuration Example

Whole Configuration Example

Figure 4:
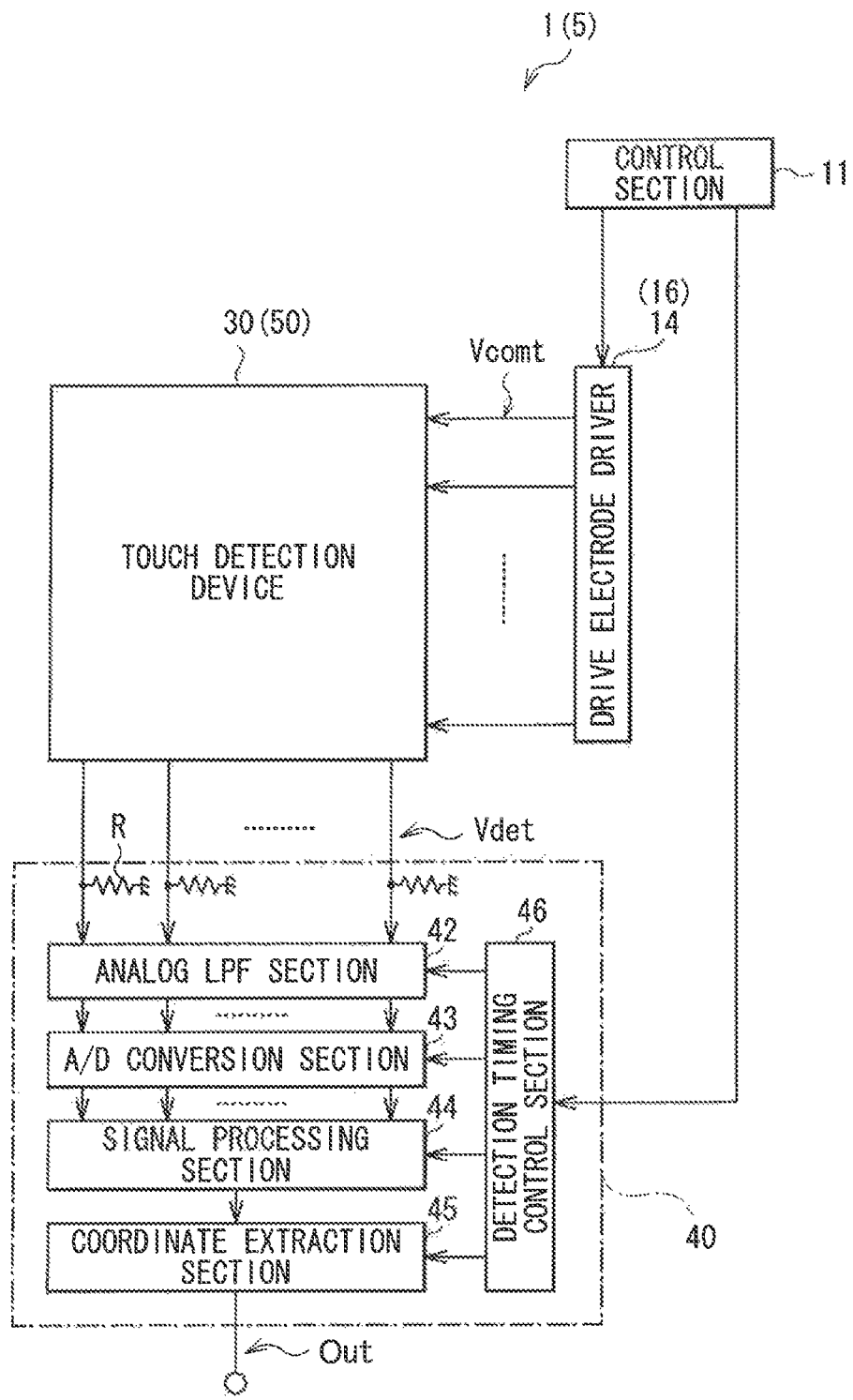
FIG. 4 is a block diagram illustrating a configuration example of a touch detector according to a first embodiment of the technology.

FIG. 4 illustrates a configuration example of a touch detector 1 according to a first embodiment of the technology. The touch detector 1 is of a capacitance system using a change, caused by an external adjacent object, in capacitance between electrodes intersecting each other. It is to be noted that a method of driving a touch detector according to an embodiment of the technology is embodied by the embodiment and will be also described below.

The touch detector 1 includes a control section 11, a drive electrode driver 14, a touch detection device 30 and a touch detection section 40.

The control section 11 is a circuit supplying control signals to the drive electrode driver 14 and the touch detection section 40, respectively, and controlling the drive electrode driver 14 and the touch detection section 40 to operate in synchronization with each other.

The drive electrode driver 14 is a circuit supplying a touch detection drive signal Vcomt to a drive electrode COML (which will be described later) of the touch detection device 30 in response to the control signal supplied from the control section 11. The touch detection drive signal Vcomt is a signal with a plurality of pulse waveforms. As will be described later, the drive electrode driver 14 simultaneously applies the touch detection drive signal Vcomt to a predetermined number of drive electrodes COML and performs scanning on drive electrodes COML to shift drive electrodes COML by a number smaller than the predetermined number of drive electrodes COML to which the touch detection drive signal Vcomt is simultaneously applied.

The touch detection device 30 operates based on a basic principle of the above-described capacitance system touch detection to output a touch detection signal Vdet. As will be described later, the touch detection device 30 performs scanning in response to the touch detection drive signal Vcomt supplied from the drive electrode driver 14 to perform touch detection.

Figure 5:
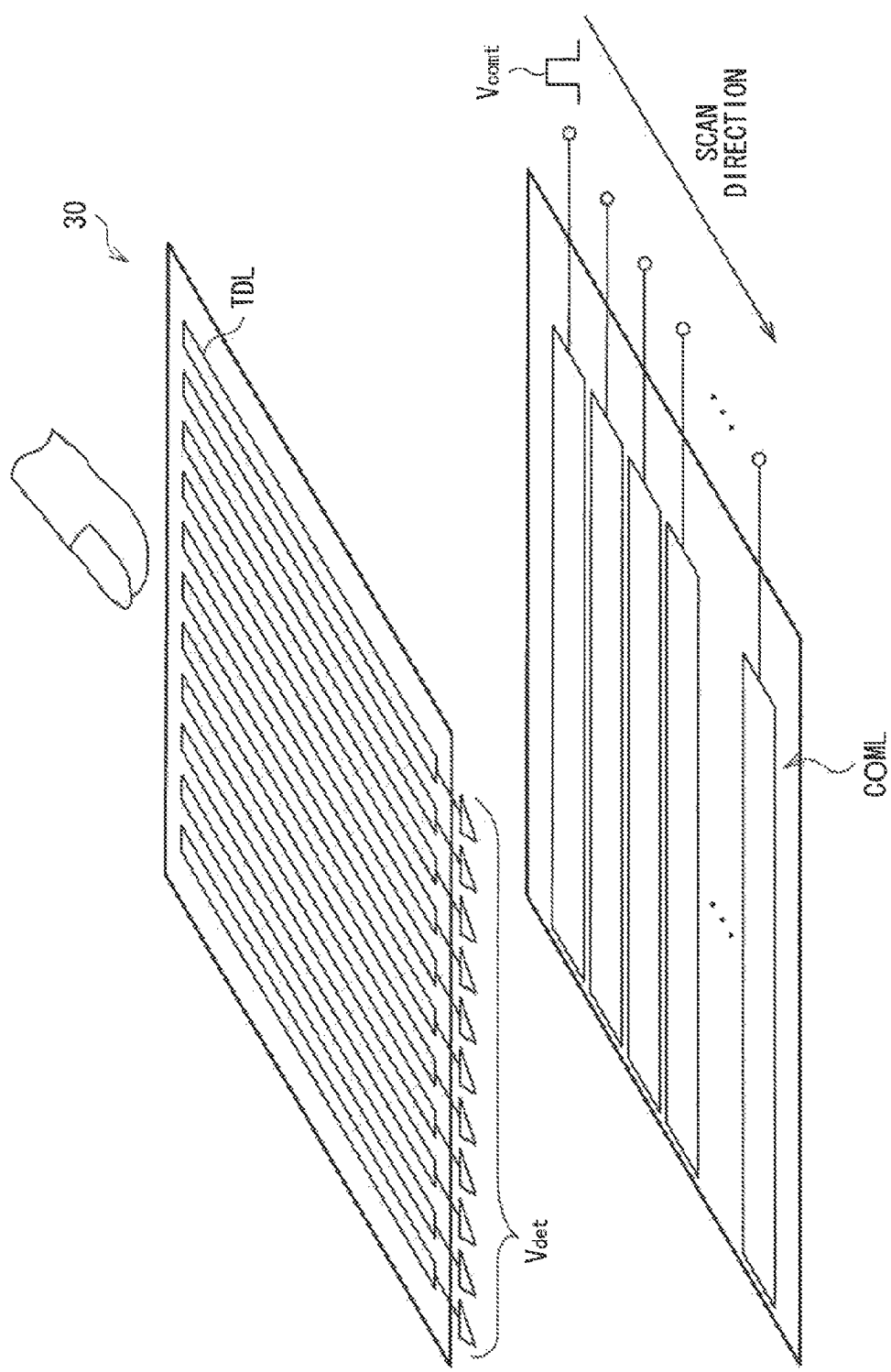
FIG. 5 is a perspective view illustrating configuration examples of drive electrodes and a touch detection electrode in a touch detection device illustrated in FIG. 4.

FIG. 5 illustrates a perspective view of a configuration example of the touch detection device 30. The touch detection device 30 is configured of the drive electrodes COML and a touch detection electrode TDL. The drive electrodes COML extend in a lateral direction in the drawing, and are formed with equal widths and arranged side by side. When the touch detection operation is performed, the touch detection drive signal Vcomt is sequentially supplied to electrode patterns of the drive electrodes COML by the drive electrode driver 14 to perform a sequential-scanning drive in a time-divisional manner. The touch detection electrode TDL is configured of electrode patterns extending in a direction orthogonal to a direction where electrode patterns of the drive electrodes COML extend. The electrode patterns of the touch detection electrode TDL are connected to the touch detection section 40. A capacitance is formed at each of intersections of the electrode patterns of the drive electrodes COML and the electrode patterns of the touch detection electrode TDL.

In this configuration, in the touch detection device 30, the drive electrode driver 14 applies the touch detection drive signal Vcomt to the drive electrodes COML to output the touch detection signal Vdet from the touch detection electrode TDL, thereby performing touch detection. In other words, the drive electrode COML corresponds to the drive electrode E1 in the basic principle of touch detection illustrated in FIGS. 1 to 3, and the touch detection electrode TDL corresponds to the touch detection electrode E2, and the touch detection device 30 detects a touch based on the basic principle. As illustrated in FIG. 5, electrode patterns intersecting each other configure capacitance system touch sensors in a matrix form. Therefore, scanning is performed over an entire touch detection surface of the touch detection device 30 to allow detection of a position where an external adjacent object touches or comes close.

The touch detection section 40 is a circuit which detects the presence or absence of a touch based on a control signal supplied from the control section 11 and a touch detection signal Vdet supplied from the touch detection device 30 and determines coordinates or the like of a touch in a touch detection region in the case where the presence of a touch is detected. The touch detection section 40 includes an analog LPF (Low Pass Filter) section 42, an A/D conversion section 43, a signal processing section 44, a coordinate extraction section 45 and a detection timing control section 46. The analog LPF section 42 is an analog low pass filter removing a high frequency component (a noise component) included in the touch detection signal Vdet supplied from the touch detection device 30 to obtain and output a touch component. A resistor R for supplying a DC potential (0 V) is connected between each input terminal of the analog LPF section 42 and a ground. It is to be noted that instead of the resistor R, for example, a switch may be arranged, and the switch may be turned on at a predetermined time to supply the DC potential (0 V). The A/D conversion section 43 is a circuit sampling an analog signal supplied from the analog LPF section 42 at a timing in synchronization with the touch detection drive signal Vcomt to convert the analog signal into a digital signal. The signal processing section 44 is a logic circuit detecting the presence or absence of a touch based on an output signal from the A/D conversion section 43. The coordinate extraction section 45 is a logic circuit determining a touched position by an interpolation operation when a touch is detected in the signal processing section 44. The detection timing control section 46 controls these circuits to operate in synchronization with one another.

The touch detection electrode TDL corresponds to a specific example of "a detection electrode" in the technology. The drive electrode driver 14 corresponds to a specific example of "a scanning drive section" in the technology.

[Operation and Functions]

Next, the operation and functions of the touch detector 1 according to the embodiment will be described below.

(Summary of Entire Operation)

First, referring to FIG. 4, a summary of an entire operation of the touch detector 1 will be described below. The control section 11 supplies control signals to the drive electrode driver 14 and the touch detection section 40, respectively, thereby controlling the drive electrode driver 14 and the touch detection section 40 to operate in synchronization with each other. The drive electrode driver 14 sequentially applies the touch detection drive signal Vcomt with a plurality of pulse waveforms to the drive electrodes COML of the touch detection device 30. The touch detection device 30 performs a touch detection operation in response to the touch detection drive signal Vcomt to output the touch detection signal Vdet from the touch detection electrode TDL. The analog LPF section 42 removes a high frequency component of the touch detection signal Vdet to output the resultant signal Vdet. The A/D conversion section 43 converts an analog signal supplied from the analog LPF section 42 into a digital signal at a timing in synchronization with the touch detection drive signal Vcomt. The signal processing section 44 detects the presence or absence of a touch based on an output signal from the A/D conversion section 43. The coordinate extraction section 45 determines a touched position when a touch is detected in the signal processing section 44. The detection timing control section 46 controls the analog LPF section 42, the A/D conversion section 43, the signal processing section 44 and the coordinate extraction section 45 to operate in synchronization with one another.

(Specific Operation)

Next, a scanning drive operation will be described in detail below.

Figure 6:
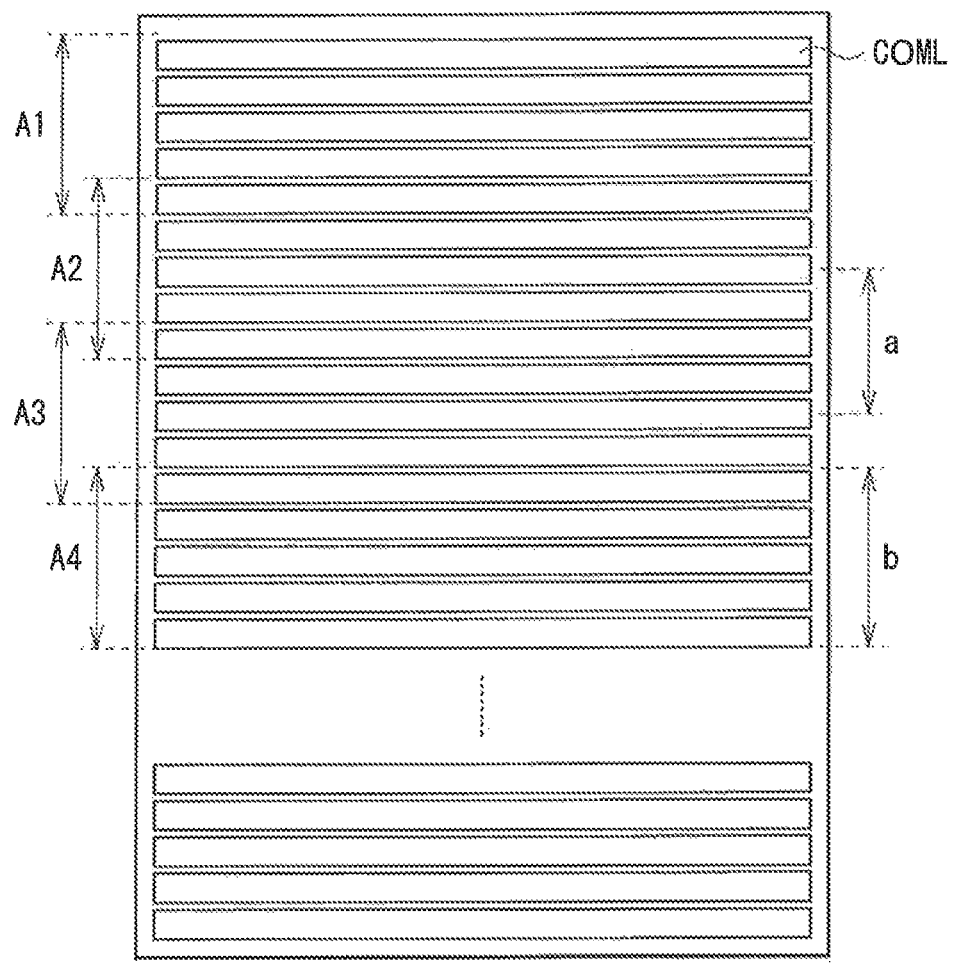
FIG. 6 is a schematic view illustrating an operation example of a scanning drive of the touch detector illustrated in FIG. 4.

FIG. 6 illustrates an operation example of a scanning drive of the touch detector 1. As illustrated in FIG. 6, the drive electrodes COML are formed with equal widths and arranged side by side. The drive electrode driver 14 drives a predetermined number of drive electrodes COML (for example, a drive area A1) in synchronization with one another. The touch detection device 30 transmits the touch detection drive signal Vcomt applied to each of the predetermined number of drive electrodes COML to the touch detection electrode TDL through a capacitance, and outputs the touch detection drive signal Vcomt as a touch detection signal Vdet. In other words, a region including the predetermined number of drive electrodes COML (for example, the drive area A1) becomes a touch detection region at that time in a touch detection surface, and the width (a touch detection width b) of the region is equal to the total width of the predetermined number of drive electrodes COML. Then, the drive electrode driver 14 performs a scanning drive on the drive electrodes COML in order of drive areas A1, A2, A3, A4, . . . in a time-divisional manner. In other words, the drive electrode driver 14 performs a scanning drive with a scanning pitch a. In this example, the drive electrode driver 14 simultaneously drives five drive electrodes COML (the touch detection width b) while scanning the drive electrodes COML to shift drive electrodes COML by four drive electrodes COML (the scanning pitch a).

In the touch detector 1, the scanning pitch a and the touch detection width b are allowed to be set freely depending on a way of driving the drive electrodes. More specifically, the scanning pitch a is allowed to be set by the number of drive electrodes in a section where adjacent drive areas (for example, the drive area A1 and the drive area A2) overlap each other in FIG. 6. Moreover, the touch detection width b is allowed to be set by the number of drive electrodes in each drive area An (where n is a natural number). Thus, in the touch detector 1, the scanning pitch a and the touch detection width b are allowed to be set independently.

The scanning pitch a correlates with position resolution when a touched position is detected. More specifically, typically, a reduction in the scanning pitch a allows the position resolution to be increased. On the other hand, the touch detection width b correlates with detection sensitivity to a touch. Typically, an increase in the touch detection width b allows the detection sensitivity to be increased, because when the touch detection width b is increased, the number of lines of electric force from the drive electrodes COML corresponding to the touch detection width b is increased according to an area thereof.

In the touch detector 1, as the scanning pitch a and the touch detection width b are allowed to be set independently, position resolution and detection sensitivity are allowed to be set independently. For example, to increase position resolution while maintaining detection sensitivity, the scanning pitch a may be reduced while maintaining the touch detection width b. On the other hand, to increase detection sensitivity while maintaining position resolution, the touch detection width b may be increased while maintaining the scanning pitch a. Moreover, for example, to increase both of position resolution and detection sensitivity, the touch detection width b may be increased and the scanning pitch a may be reduced.

Thus, in the touch detector 1, as the scanning pitch a and the touch detection width b are allowed to be set independently, position resolution when a touched position is detected and detection sensitivity to a touch are allowed to be set independently.

Figure 7:
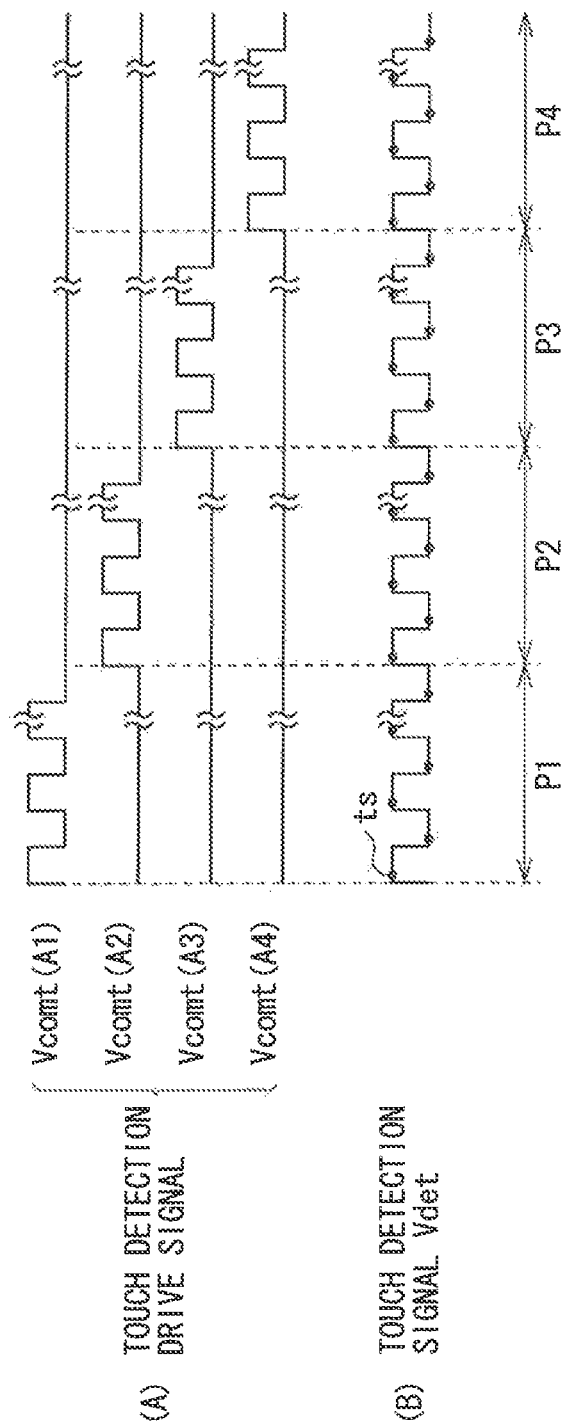
FIG. 7 is a timing waveform chart illustrating an operation example of the touch detector illustrated in FIG. 4.

FIG. 7 illustrates a timing waveform example of the touch detector 1, a part A indicates a waveform of the touch detection drive signal Vcomt, and a part B indicates a waveform of the touch detection signal Vdet.

The drive electrode driver 14 applies the touch detection drive signal Vcomt with a plurality of pulse waveforms to the drive electrodes COML from one of the drive area An to another in a time-divisional manner (refer to the part A in FIG. 7). The touch detection device 30 outputs a signal based on the touch detection drive signal Vcomt as the touch detection signal Vdet (refer to the part B in FIG. 7). Then, the touch detection section 40 separately analyzes the touch detection signals Vdet of the drive areas An to detect the presence or absence of a touch, a touched position or the like.

More specifically, first, in a period P1, the drive electrode driver 14 applies the touch detection drive signal Vcomt with a plurality of pulse waveforms to the drive electrodes COML assigned to the drive area A1 (Vcomt (A1) in the part A in FIG. 7). In the touch detection device 30, the touch detection drivel signal Vcomt is transmitted to the touch detection electrode TDL through a capacitance between the drive electrodes COML assigned to the drive area A1 and the touch detection electrode TDL to change the touch detection signal Vdet (refer to the part B in FIG. 7). The A/D conversion section 43 of the touch detection section 40 samples an output signal of the analog LPF section 42 to which the touch detection signal Vdet is supplied at sampling timings is according to transitions of a plurality of pulse waveforms of the touch detection drive signal Vcomt (refer to the part B in FIG. 7) to perform A/D conversion. The signal processing section 44 determines the presence or absence of a touch in a region corresponding to the drive area A1 based on a plurality of A/D conversion results.

In a period P2 and subsequent periods, the touch detector 1 performs touch detection as in the case of the period P1. More specifically, for example, in the period P2, the drive electrode driver 14 applies the touch detection drive signal Vcomt to the drive electrodes COML assigned to the drive area A2 (Vcomt (A2) in the part A in FIG. 7). In the touch detection device 30, the touch detection drive signal Vcomt is transmitted to the touch detection electrode TDL through a capacitance between the drive electrodes COML assigned to the drive area A2 and the touch detection electrode TDL to change the touch detection signal Vdet (refer to the part B in FIG. 7). Then, the A/D conversion section 43 and the signal processing section 44 determine the presence or absence of a touch in a region corresponding to the drive area A2 based on the touch detection signal Vdet.

Thus, the signal processing section 44 determines the presence or absence of a touch from one of regions corresponding to the drive areas An to another by performing the above-described operation on an entire touch detection surface. Then, the coordinate extraction section 45 of the touch detection section 40 performs an interpolation operation by, for example, an weighted average of a plurality of regions (positions) where a touch is detected based on touch detection results in all drive areas An to detect the touched position.

In the touch detector 1, the drive electrode driver 14 applies the touch detection drive signal Vcomt with a plurality of pulse waveforms to the drive electrodes COML from one of the drive areas An to another, and the analog LPF section 42, the A/D conversion section 43 and the signal processing section 44 of the touch detection section 40 detect a touch in regions corresponding to the drive areas An based on the touch detection signals Vdet supplied from the touch detection electrode TDL. In other words, these circuit blocks detect a touch in a region corresponding to each drive area An based on a plurality of sampling results. Therefore, the sampling results are allowed to be analyzed statistically, and a reduction in S/N ratio caused by variations in sampling results is allowed to be minimized.

Moreover, in the touch detector 1, the drive electrode driver 14 applies the touch detection drive signal Vcomt with a plurality of pulse waveforms to the drive electrodes COML from one of regions corresponding to the drive areas An to another, and the analog LPF section 42, the A/D conversion section 43 and the signal processing section 44 of the touch detection section 40 detect a touch from one of the regions to another. Therefore, it is only necessary to simply add up (average) data detected by a plurality of drives on each of the drive regions An, thereby allowing the configuration of the touch detection section 40 to be simplified.

As a method of detecting a touch based on a plurality of sampling results to improve an S/N ratio, in addition to the above-described method, for example, a method of simultaneously applying a touch detection drive signal with one pulse waveform to a predetermined number of drive electrodes COML and scanning the drive electrodes COML from one to another is considered. In such a method, in the case where detection data are added up (averaged) simply in the above-described manner, data of adjacent drive electrodes COML are mixed; therefore, a considerable decline in position accuracy may be caused. To reduce the decline in position accuracy, for example, a method of collecting all A/D conversion results on the entire touch detection surface and separating contributions by regions corresponding to respective drive electrodes COML to determine touch detection in respective regions is considered; however, in this case, the configuration of the signal processing section may be complicated. On the other hand, in the touch detector 1 according to the embodiment, touch detection is allowed to be independently performed from one of the drive areas An to another; therefore, the configuration of the signal processing section 44 is allowed to be simplified.

Figure 8:
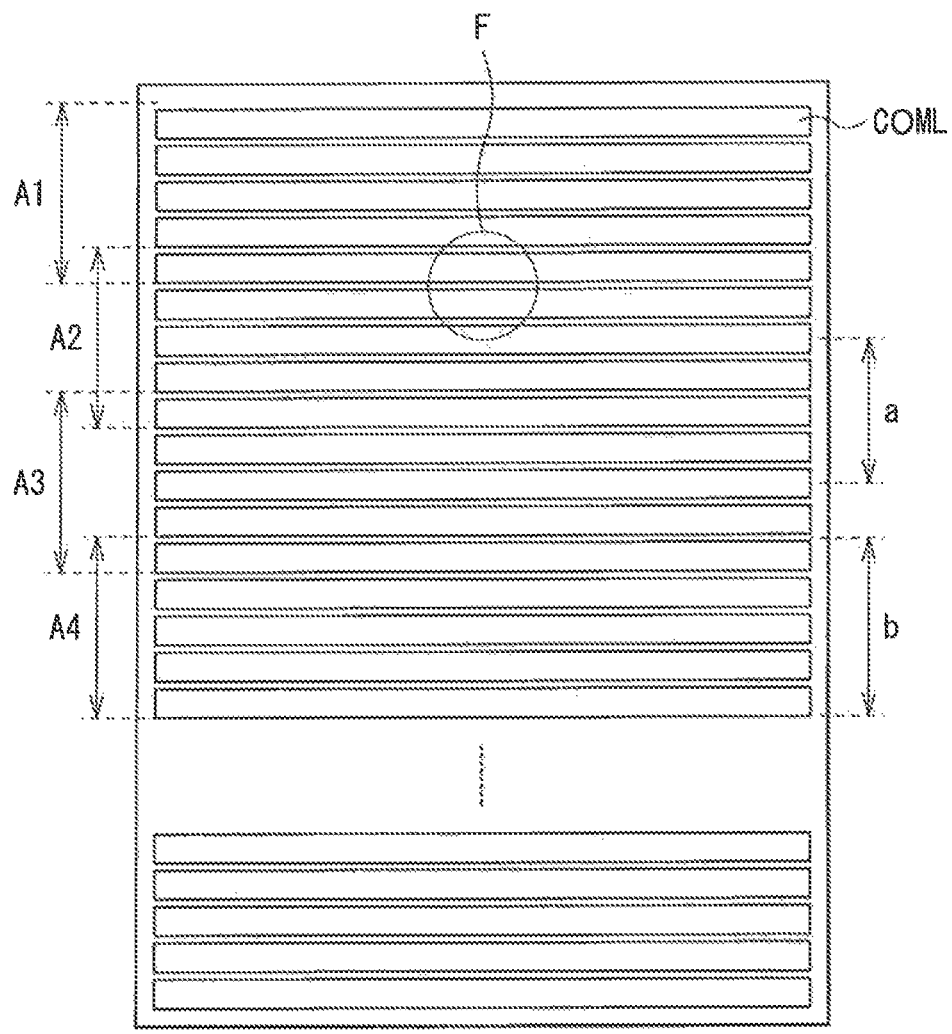
FIG. 8 is a schematic view illustrating an operation example of a scanning drive of the touch detector illustrated in FIG. 4.

FIG. 8 illustrates an operation example of the touch detector 1. In this example, a finger or the like of a user touches a region (a touch region F) across the drive areas A1 and A2. When touch detection is performed on the drive area A1, only a half of the touch region F overlaps the drive area A1; therefore, the detection sensitivity to the touch is reduced, and it is difficult to perform touch detection. However, when the touch detection is performed on the drive area A2, a larger area of the touch detection region F overlaps the drive area A2; therefore, the detection sensitivity is increased, and the touch detection is easily performed.

Thus, in the touch detector 1, when the drive electrodes COML are driven, the drive areas An overlap one another; therefore, for example, even in the case where a region across two drive areas is touched, an area where the touched region and the drive area An overlap each other is allowed to be increased, thereby allowing detection sensitivity to be increased. In other words, in the case where a drive is performed on the drive areas An which do not overlap one another, more specifically, for example, in the case where a drive is performed on the drive area A1 and the drive area A2 adjacent to each other, when an area where the touched region and the drive area A1 overlap each other is equal to a half of the touched region, an area where the touched region and the drive area A2 overlap each other is equal to a half of the touched region. Therefore, in such a case, in both of the case where touch detection is performed on the drive area A1 and the case where touch detection is performed on the drive area A2, detection sensitivity is reduced. On the other hand, in the touch detector 1, as illustrated in FIG. 8, when an area where the touched region F and the drive area A1 overlap each other is equal to a half of the touched region F, an area where the touched region F and the drive area A2 overlap each other is larger than a half of the touched region F; therefore, detection sensitivity is allowed be increased, and touch detection is allowed to be easily performed.

Comparative Examples

Next, compared to some comparative examples, functions of the embodiment will be described below.

Figure 9:
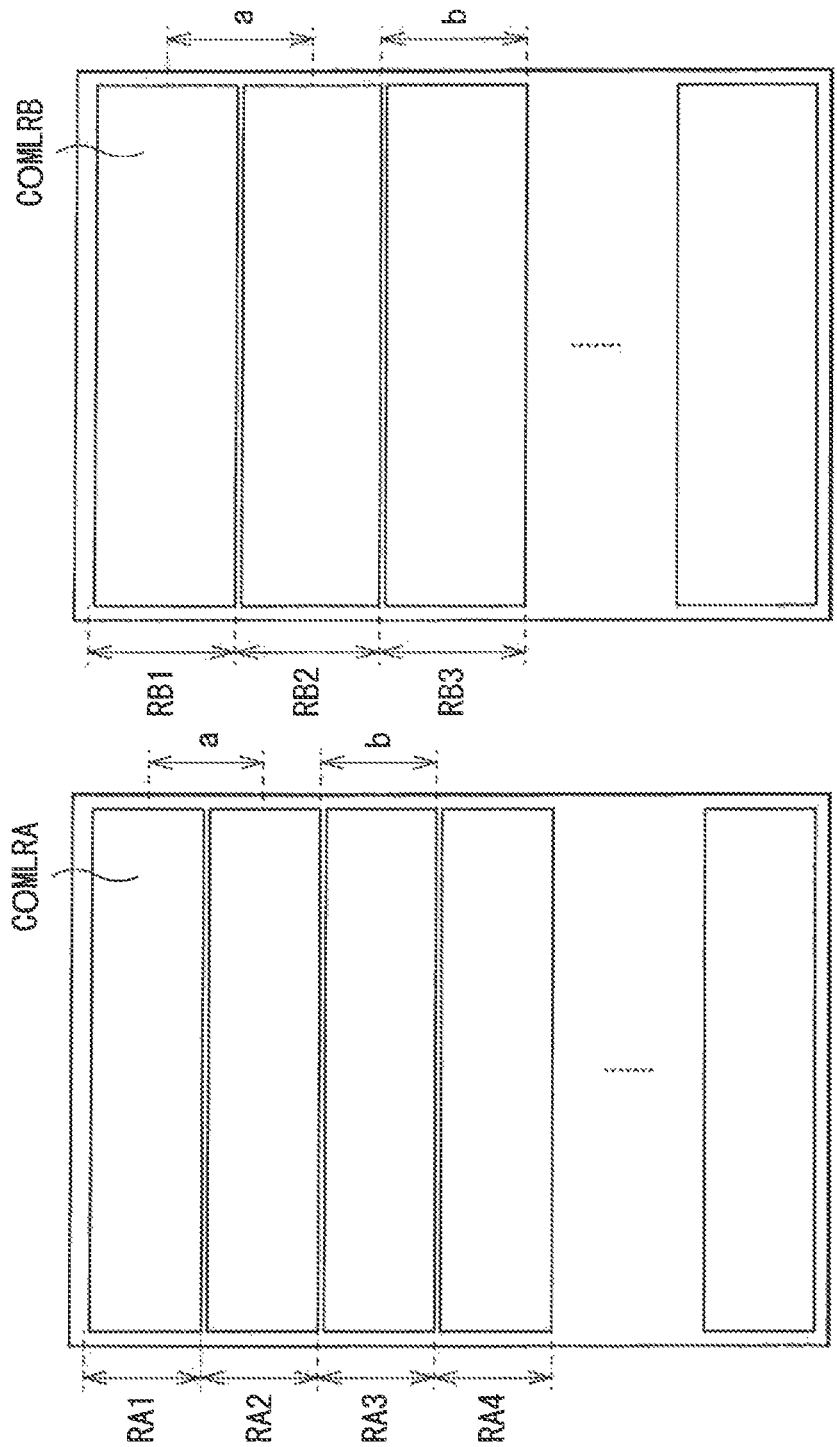
FIGS. 9A and 9B are schematic views illustrating operation examples of scanning drives of touch detectors according to comparative examples.

FIGS. 9A and 9B illustrate operation examples of scanning drives of touch detectors according to Comparative Examples 1 and 2, respectively. In these comparative examples, as illustrated in FIGS. 9A and 9B, to increase touch detection sensitivity, drive electrodes COMLRA and COMLRB are formed to have a larger width than that of the drive electrode COML (refer to FIG. 6) according to the embodiment.

In Comparative Examples 1 and 2, a drive electrode driver sequentially applies a touch detection drive signal Vcomt with a plurality of pulse signals to respective drive areas RAn or RBn (where n is a natural number) in a time-divisional manner. In this case, the scanning pitch a and the touch detection width b are equal to the width of the drive area RAn or RBn (in other words, the width of the drive electrode COMLRA or COMLRB). In other words, in Comparative Examples 1 and 2, the scanning pitch a and the touch detection width b become equal to each other, thereby not allowing the scanning pitch a and the touch detection width b to be set independently. Therefore, for example, in the case where detection sensitivity to a touch is not sufficient in Comparative Example 1 illustrated in FIG. 9A, as illustrated in FIG. 9B, when the drive electrode COMLRB with a larger width is formed (the touch detection width b is increased) to increase detection sensitivity, the scanning pitch a is also increased to cause a reduction in position resolution when a touched position is detected. Moreover, for example, in the case where position resolution when a touched position is detected is not sufficient in Comparative Example 2 illustrated in FIG. 9B, as illustrated in FIG. 9A, when the drive electrode COMLRA with a smaller width is formed (the scanning pitch a is reduced) to increase position resolution, the touch detection width b is also reduced to cause a reduction in detection sensitivity.

On the other hand, in the touch detector 1 according to the embodiment, the scanning pitch a and the touch detection width b are allowed to be set independently; therefore, position resolution when a touched position is detected and detection sensitivity to a touch are allowed to be set independently. In other words, when the touch detection width b is increased and the scanning pitch a is reduced, position resolution and detection sensitivity are allowed to be increased. In particular, in the case where the scanning pitch a is set to be smaller than the touch detection width b, compared to Comparative Examples 1 and 2, both characteristics are allowed to be increased.

Effects

As described above, in the embodiment, as the scanning pitch a is smaller than the touch detection width b, both of position resolution when a touched position is detected and detection sensitivity to a touch are allowed to be increased.

Moreover, in the embodiment, the scanning pitch a and the touch detection width b are set by a way of driving the drive electrodes; therefore, the scanning pitch a and the touch detection width b are allowed to be set independently, and position resolution and detection sensitivity are allowed to be set independently.

Further, in the embodiment, the drive electrode driver applies the touch detection drive signal from one of regions corresponding to the drive areas to another, and the touch detection section detects a touch; therefore, touch detection in each of the regions corresponding to the drive areas is allowed to be performed independently of other regions, and the configuration of the touch detection section is allowed to be simplified.

Moreover, in the embodiment, as the drive areas overlap one another, for example, in the case where a region across two drive areas is touched, an area where the touched region and the drive area overlap each other is allowed to be increased, thereby increasing detection sensitivity.

3. Second Embodiment

Next, a touch detector 5 according to a second embodiment of the technology will be described below. In the first embodiment (refer to FIG. 6), the touch detection device 30 is configured with use of drive electrodes COML with equal widths; however, in the embodiment, a touch detection device 50 is configured with use of plural kinds of drive electrodes with different widths instead of the drive electrodes with equal widths. In other words, the touch detector 5 is configured of such a touch detection device 50 and a drive electrode driver 16 driving the touch detection device 50. Other configurations are the same as those in the first embodiment (refer to FIG. 4). It is to be noted that like components are denoted by like numerals as of the touch detector 1 according to the first embodiment and will not be further described.

Figure 10:
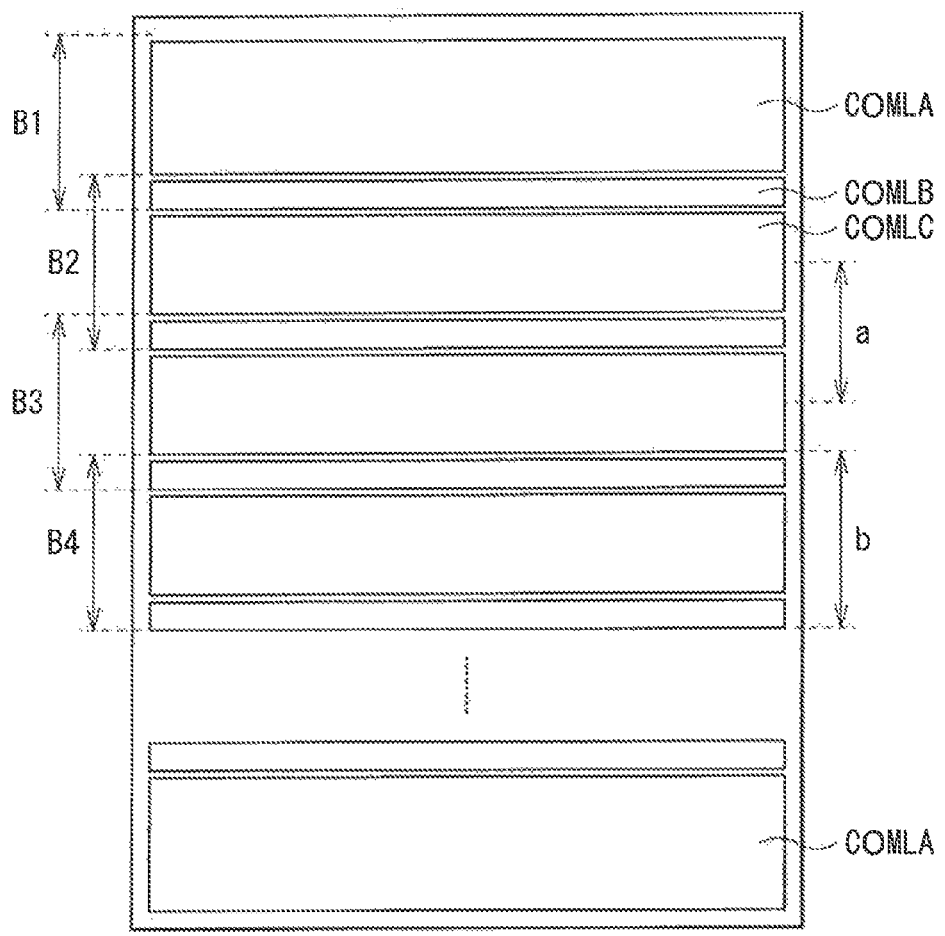
FIG. 10 is a plan view illustrating a configuration example of drive electrodes in a touch detection device according to a second embodiment.

FIG. 10 illustrates a configuration example of drive electrodes of the touch detection device 50. As illustrated in FIG. 10, the touch detection device 50 includes three kinds of drive electrodes COMLA, COMLB and COMLC with different widths. In this example, the width of the drive electrode COMLA is substantially equal to the total width of the drive electrode COMLB and the drive electrode COMLC. The drive electrode driver 16 drives the drive electrodes COMLA, COMLB and COMLC in combination from one of drive areas Bn (where n is an integer) to another. For example, the drive electrode driver 16 simultaneously drives the drive electrode COMLC and the drive electrodes COMLB on both sides thereof in a drive on the drive area B2. Then, the drive electrode driver 16 performs a scanning drive on these drive electrodes in order of the drive areas B1, B2, B3, B4, . . . in a time-divisional manner. At this time, the drive electrode COMLB in a region where adjacent drive areas Bn (for example, the drive areas B2 and B3) overlap each other is used in drives on these adjacent drive areas. Thus, the drive electrode driver 16 simultaneously drives the drive electrodes corresponding to the touch detection width b, and performs scanning on drive electrodes with the scanning pitch a.

As illustrated in FIG. 10, the scanning pitch a corresponds to the total width of the drive electrode COMLB and the drive electrode COMLC. Moreover, the touch detection width b corresponds to the total width of two drive electrodes COMLB and the drive electrode COMLC. Therefore, the widths of the drive electrodes COMLB and COMLC are allowed to be determined based on necessary position resolution (scanning pitch a) and necessary detection sensitivity (touch detection width b).

In the touch detector 5, three kinds of drive electrodes COMLA, COMLB and COMLC with different widths are used. More specifically, these drive electrodes COMLA, COMLB and COMLC (refer to FIG. 10) are configured by connecting the drive electrodes COML simultaneously driven in the first embodiment (refer to FIG. 6) to have a large width. Therefore, in the touch detector 5, compared to the touch detector 1 according to the first embodiment, the number of drive electrodes is allowed to be reduced. Therefore, the number of drive electrodes driven by the drive electrode driver 16 is reduced, thereby allowing the configuration of the drive electrode driver 16 to be simplified.

Thus, in the embodiment, plural kinds of drive electrodes with different widths are used; therefore, the number of drive electrodes are allowed to be reduced, and the configuration of the drive electrode driver 16 is allowed to be simplified. Other effects are the same as those in the first embodiment.

4. Third Embodiment

Next, a display 7 with a touch detection function according to a third embodiment of the technology will be described below. The display 7 with a touch detection function is a so-called in-cell type apparatus configured by integrating the touch detection device 30 according to the first embodiment and a liquid crystal display device using a liquid crystal display element as a display element. It is to be noted that like components are denoted by like numerals as of the touch detector 1 according to the first embodiment and will not be further described.

Figure 11:
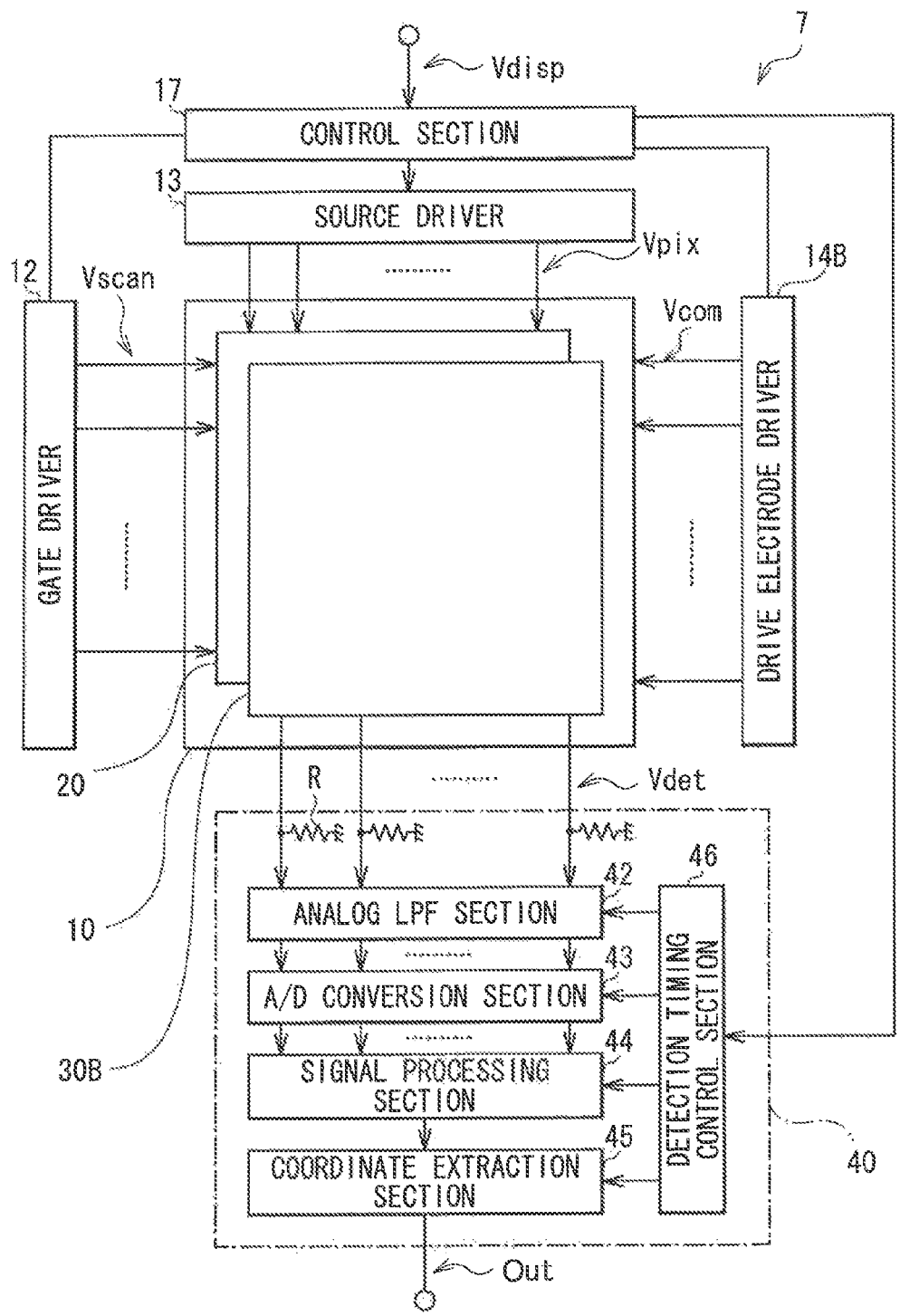
FIG. 11 is a block diagram illustrating a configuration example of a display with a touch detection function according to a third embodiment.

FIG. 11 illustrates a configuration example of the display 7 with a touch detection function. The display 7 with a touch detection function includes a display device 10 with a touch detection function, a control section 17, a gate driver 12, a source driver 13 and a drive electrode driver 14B.

The display device 10 with a touch detection function is a display device having a touch detection function. The display device 10 with a touch detection function includes a liquid crystal display device 20 and a touch detection device 30B. As will be described later, the liquid crystal display device 20 is a device performing display while sequentially scanning from one horizontal line to another in response to a scanning signal Vscan supplied from the gate driver 12. The touch detection device 30B has the same configuration as that of the touch detection device 30 according to the first embodiment.

Figure 12:
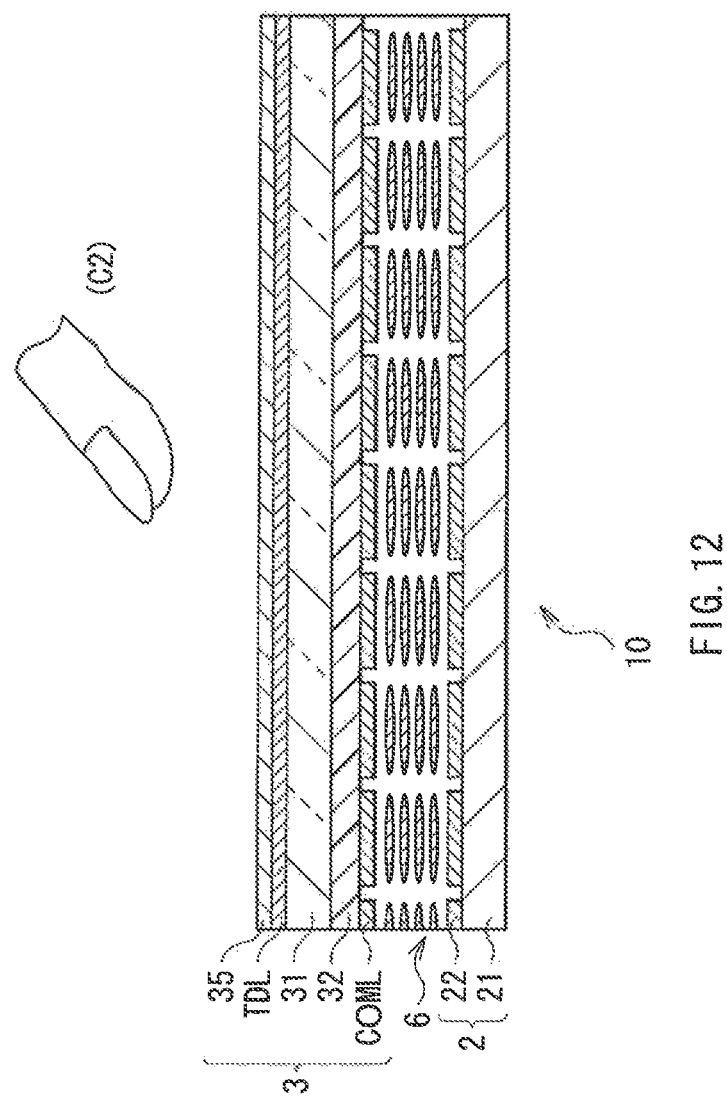
FIG. 12 is a schematic sectional view illustrating a configuration of a display device with a touch detection function illustrated in FIG. 11.

FIG. 12 illustrates an example of a sectional configuration of a main part of the display device 10 with a touch detection function. The display device 10 with a touch detection function includes a pixel substrate 2, an opposed substrate 3 facing the pixel substrate 2 and a liquid crystal layer 6 sandwiched between the pixel substrate 2 and the opposed substrate 3.

The pixel substrate 2 includes a TFT substrate 21 as a circuit substrate and a plurality of pixel electrodes 22 arranged in a matrix form on the TFT substrate 21. Although not illustrated herein, in the TFT substrate 21, thin film transistors (TFTs) of respective pixels, wiring lines such as a pixel signal line SGL supplying a pixel signal Vpix to each pixel electrode 22 and a scanning signal line GCL driving each TFT are formed.

The opposed substrate 3 includes a glass substrate 31, a color filter 32 formed on one surface of the glass substrate 31 and a plurality of drive electrodes COML formed on the color filter 32. The color filter 32 is configured by periodically arranging color filter layers of three colors, for example, red (R), green (G) and blue (B), and a combination of three colors R, G and B is assigned to each display pixel. Each of the drive electrodes COML functions as a common drive electrode of the liquid crystal display device 20, and functions as a drive electrode of the touch detection device 30B. The drive electrodes COML are connected to the TFT substrate 21 through a contact conductive pillar (not illustrated), and a drive signal Vcom (a display drive signal Vcomd and a touch detection drive signal Vcomt) with an AC rectangular waveform is applied from the TFT substrate 21 to the drive electrodes COML through the contact conductive pillar. A touch detection electrode TDL as a detection electrode of the touch detection device 30B is formed on the other surface of the glass substrate 31. The touch detection electrode TDL is made of, for example, ITO (Indium Tin Oxide), and is a translucent electrode. Moreover, a polarizing plate 35 is arranged on the touch detection electrode TDL.

The liquid crystal layer 6 modulates light passing therethrough according to an electric field state, and uses a liquid crystal of any of various modes such as a TN (Twisted Nematic) mode, a VA (Vertical Alignment) mode and a ECB (Electrically Controlled Birefringence) mode.

Although not illustrated herein, alignment films are arranged between the liquid crystal layer 6 and the pixel substrate 2 and between the liquid crystal layer 6 and the opposed substrate 3, respectively, and an incident side polarizing plate is arranged on a lower surface of the pixel substrate 2.

Figure 13:
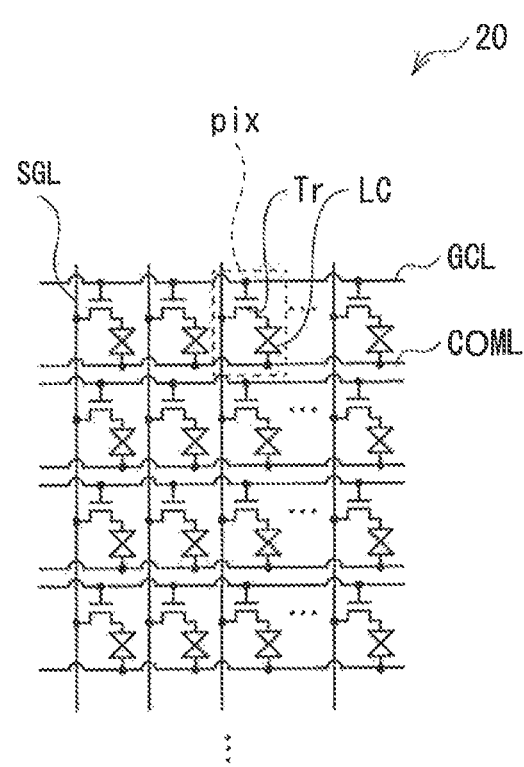
FIG. 13 is a circuit diagram illustrating a pixel arrangement of the display device with a touch detection function illustrated in FIG. 11.

FIG. 13 illustrates a configuration example of a pixel configuration in the liquid crystal display device 20. The liquid crystal display device 20 includes a plurality of pixels Pix arranged in a matrix form. The pixels Pix each include a TFT element Tr and a liquid crystal element LC. The TFT element Tr is configured of a thin film transistor, and in this example, the TFT element Tr is configured of an re-channel MOS (Metal Oxide Semiconductor) type TFT. A source of the TFT element Tr is connected to the pixel signal line SGL, and a gate thereof is connected to the scanning signal line GCL, and a drain thereof is connected to an end of the liquid crystal element LC. The one end of the liquid crystal element LC is connected to the drain of the TFT element Tr, and the other end thereof is connected to the drive electrode COML.

The pixels Pix assigned to the same row in the liquid crystal display device 20 are connected to one another by the scanning signal line GCL. The scanning signal line GCL is connected to the gate driver 12, and the scanning signal Vscan (which will be described later) is supplied by the gate driver 12 to the scanning signal line GCL. Moreover, the pixels Pix assigned to the same column in the liquid crystal display device 20 are connected to one another by the pixel signal line SGL. The pixel signal line SGL is connected to the source driver 13, and the pixel signal Vpix (which will be described later) is supplied from the source driver 13 to the pixel signal line SGL.

Moreover, the pixels Pix assigned to the same row in the liquid crystal display device 20 are connected to one another by the drive electrodes COML. The drive electrodes COML are connected to the drive electrode driver 14B, and the drive signal Vcom (the display drive signal Vcomd and the touch detection drive signal Vcomt) is supplied from the drive electrode driver 14B to the drive electrodes COML.

The control section 17 is a circuit supplying control signals to the gate driver 12, the source driver 13, the drive electrode driver 14B and the touch detection section 40 in response to a picture signal Vdisp externally supplied, respectively, to control them to operate in synchronization with one another.

The gate driver 12 has a function of sequentially selecting one horizontal line to be subjected to a display drive of the display device 10 with a touch detection function in response to the control signal supplied from the control section 17. More specifically, the gate driver 12 applies the scanning signal Vscan to the gates of the TFT elements Tr of the pixels Pix through the scanning signal line GCL to sequentially select pixels Pix to be subjected to a display drive configuring one line (one horizontal line) from the pixels Pix formed in a matrix form in the liquid crystal display device 20 of the display device 10 with a touch detection function.

The source driver 13 is a circuit supplying the pixel signal Vpix to each pixel Pix of the display device 10 with a touch detection function in response to the control signal supplied from the control section 17. More specifically, as will be described later, the source driver 13 supplies the pixel signal Vpix to the pixels Pix configuring one horizontal line sequentially selected by the gate driver 12 through the pixel signal line SGL. Then, in these pixels Pix, one horizontal line is displayed in response to the supplied pixel signal Vpix.

The drive electrode driver 14B is a circuit supplying the drive signal Vcom to the drive electrodes COML of the display device 10 with a touch detection function in response to the control signal supplied from the control section 17. More specifically, the drive electrode driver 14B performs display scanning by sequentially applying the display drive signal Vcomd to the drive electrodes COML in a time-divisional manner in a display operation. Then, in a touch detection operation, as in the case of the first embodiment, the touch detection drive signal Vcomt is sequentially applied to the drive electrodes COML in a time-divisional manner to perform touch detection scanning.

In the touch detection operation, the display 7 with a touch detection function operates as in the case of the touch detector 1 according to the first embodiment. In other words, the drive electrode driver 14B simultaneously drives the drive electrodes COML corresponding to the touch detection width b and performs scanning on the drive electrodes COML with the scanning pitch a. The display device 10 with a touch detection function outputs the touch detection signal Vdet based on the touch detection drive signal Vcomt applied to the drive electrodes COML in this drive. The touch detection section 40 detects the presence or absence of a touch based on the touch detection signal Vdet to determine coordinates or the like of a touched position when the presence of a touch is detected.

As described above, in the embodiment, the touch detection device and the liquid crystal display device are integrated; therefore, the display with a touch detection function is allowed to be downsized. Other effects are the same as those in the first embodiment.

In the above-described embodiment, the touch detection device 30 according to the first embodiment and the liquid crystal display device are integrated; however, the technology is not limited thereto, and, for example, the touch detection device 50 according to the second embodiment and the liquid crystal display device may be integrated.

5. Application Examples

Next, referring to FIG. 14 to FIGS. 18A to 18G, application examples of the touch detector described in the above-described embodiments will be described below. The touch detectors according to the above-described embodiments and the like are applicable to electronic units in any fields, such as televisions, digital cameras, notebook personal computers, portable terminal devices such as cellular phones, and video cameras. In other words, the touch detectors according to the above-described embodiments and the like are applicable to electronic units in any fields displaying a picture signal externally supplied or a picture signal produced inside as an image or a picture.

Application Example 1

Figure 14:
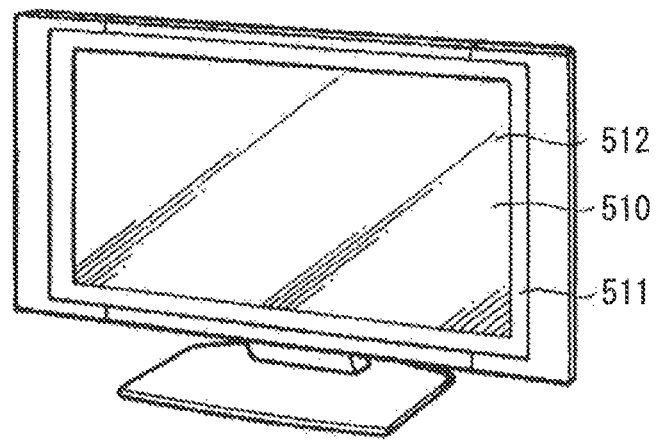
FIG. 14 is an external perspective view of Application Example 1 of the touch detector according to any of the embodiments.

FIG. 14 illustrates an appearance of a television to which the touch detector according to any of the above-described embodiments and the like is applied. The television includes, for example, a picture display screen section 510 including a front panel 511 and a filter glass 512, and the picture display screen section 510 is configured of the touch detector according to any of the above-described embodiments and the like.

Application Example 2

Figure 15A:
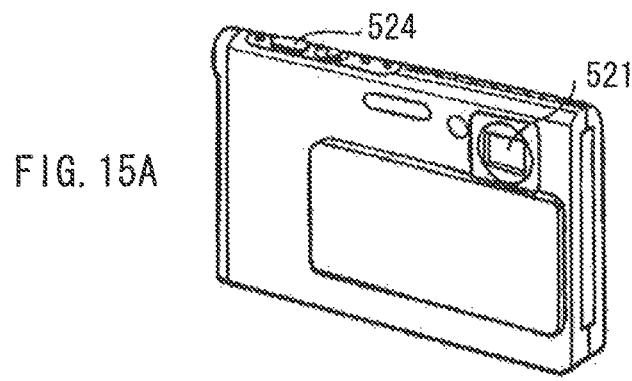
FIGS. 15A and 15B are external perspective views of Application Example 2.
Figure 15B:
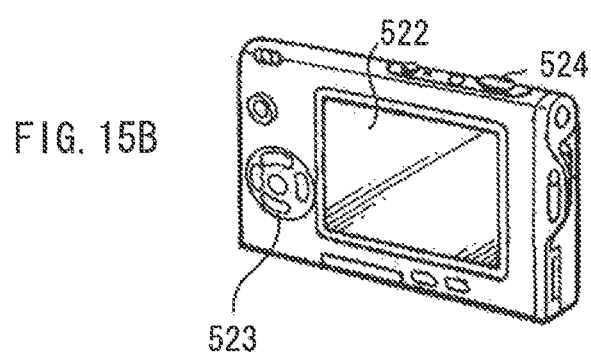

FIGS. 15A and 15B illustrate an appearance of a digital camera to which the touch detector according to any of the above-described embodiments and the like is applied. The digital camera includes, for example, a light-emitting section for a flash 521, a display section 522, a menu switch 523 and a shutter button 524, and the display section 522 is configured of the touch detector according to any of the above-described embodiments and the like.

Application Example 3

Figure 16:
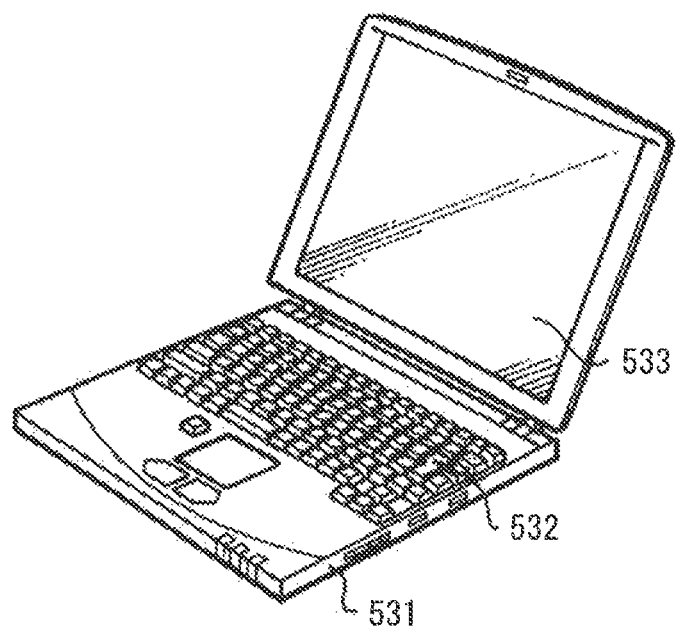
FIG. 16 is an external perspective view of Application Example 3.

FIG. 16 illustrates an appearance of a notebook personal computer to which the touch detector according to any of the above-described embodiments and the like is applied. The notebook personal computer includes, for example, a main body 531, a keyboard 532 for operation of inputting characters and the like and a display section 533 for displaying an image, and the display section 533 is configured of the touch detector according to any of the above-described embodiments and the like.

Application Example 4

Figure 17:
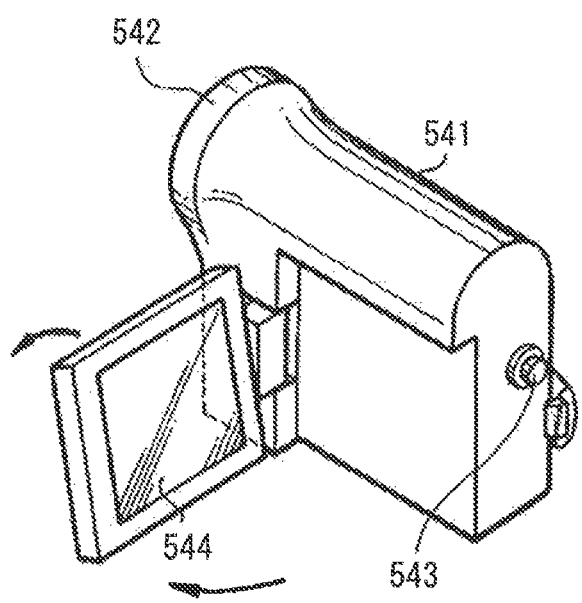
FIG. 17 is an external perspective view of Application Example 4.
Figure 18:
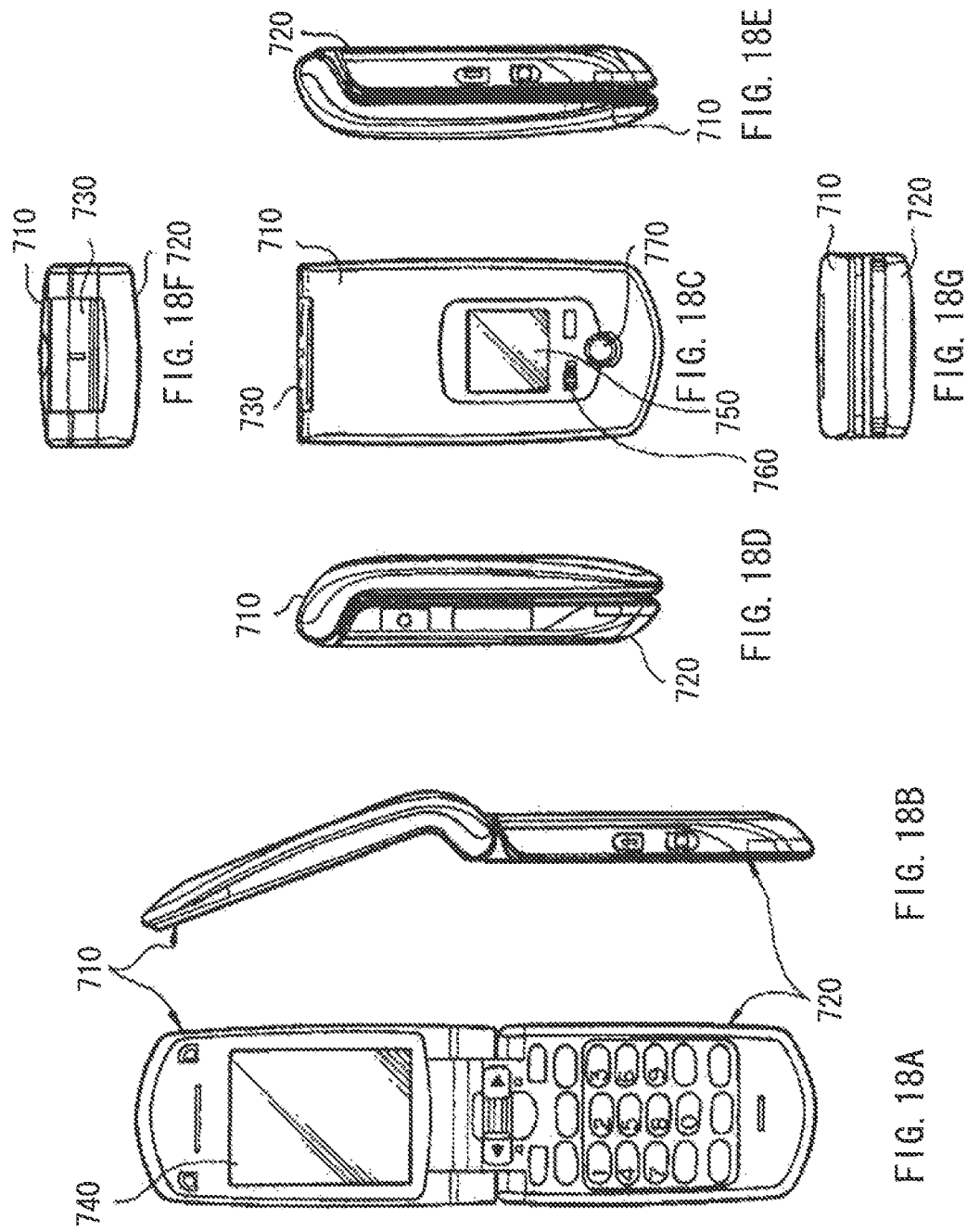
FIGS. 18A to 18G are front, side, top and bottom views of Application Example 5.

FIG. 17 illustrates an appearance of a video camera to which the touch detector according to any of the above-described embodiments and the like is applied. The video camera includes, for example, a main body 541, a lens for shooting an object 542 arranged on a front surface of the main body 541, a shooting start/stop switch 543 and a display section 544, and the display section 544 is configured of the touch detector according to any of the above-described embodiments and the like.

Application Example 5

FIGS. 18A to 18G illustrate an appearance of a cellular phone to which the touch detector according to any of the above-described embodiments and the like is applied. The cellular phone is formed by connecting, for example, a top-side enclosure 710 and a bottom-side enclosure 720 to each other by a connection section (hinge section) 730, and the cellular phone includes a display 740, a sub-display 750, a picture light 760, and a camera 770. The display 740 or the sub-display 750 is configured of the touch detector according to any of the above-described embodiments and the like.

Although the present technology is described referring to the embodiments and application examples to electronic units; however, the technology is not limited thereto, and may be variously modified.

Figure 19:
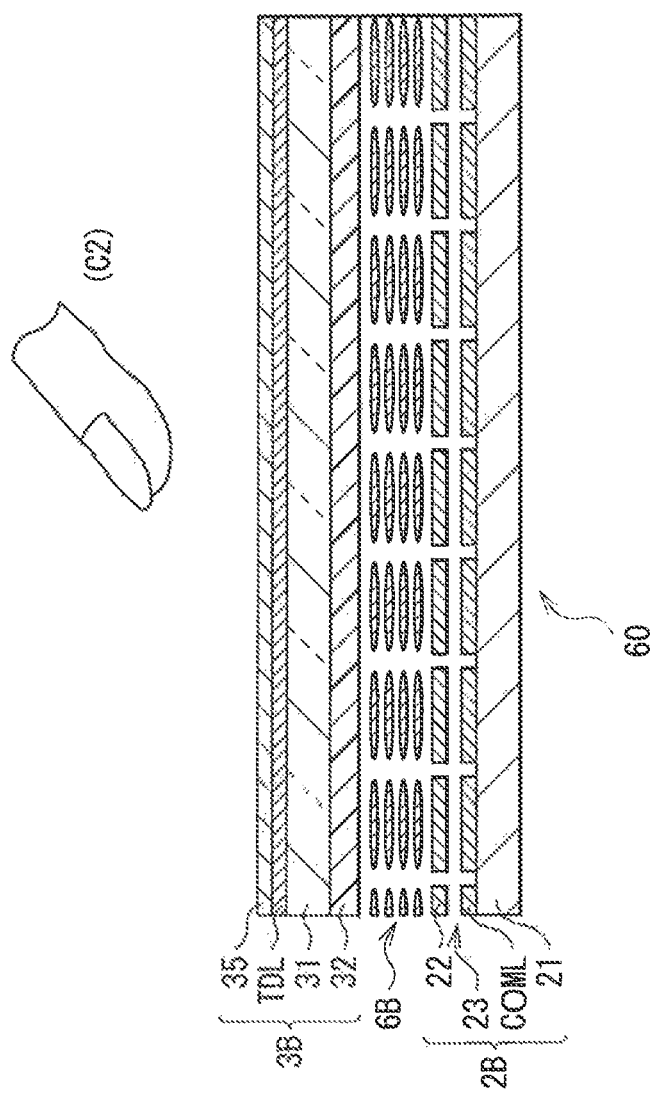
FIG. 19 is a schematic sectional view illustrating a configuration of a display device with a touch detection function according to a modification.

For example, in the third embodiment, the liquid crystal display device 20 using a liquid crystal of any of various modes such as TN, VA and ECB and the touch detection device 30 are integrated to configure the display device 10 with a touch detection function; however, a liquid crystal display device using a transverse electric mode liquid crystal such as a FFS (Fringe Field Switching) mode or an IPS (In-Plane-Switching) mode and the touch detection device may be integrated. For example, in the case where the transverse electric mode liquid crystal is used, a display device 60 with a touch detection function is allowed to be configured as illustrated in FIG. 19. This drawing illustrates an example of a sectional configuration of a main part of the display device 60 with a touch detection function, and illustrates a state where a liquid crystal layer 6B is sandwiched between a pixel substrate 2B and an opposed substrate 3B. Names, functions and the like of other components are the same as those in FIG. 12, and will not be described. In this example, unlike the case of FIG. 12, the drive electrode COML used for both of display and touch detection is formed directly above the TFT substrate 21 to configure a part of the pixel substrate 2B. The pixel electrode 22 is arranged above the drive electrode COML with an insulating layer 23 in between. In this case, all dielectrics also including the liquid crystal layer 6B between the drive electrodes COML and the touch detection electrodes TDL contribute to the formation of the capacitive element C1.

The present application contains subject matter related to that disclosed in Japanese Priority Patent Application 2010-214188 filed in the Japan Patent Office on Sep. 24, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A touch detector comprising:
  a plurality of drive electrodes arranged side by side to extend in a first direction;
  a detection electrode extending in a second direction orthogonal to the first direction, and arranged to form a capacitance at each of intersections with the drive electrodes; and
  a scanning drive section sequentially selecting a plurality of target electrodes from the drive electrodes in a time-divisional manner, and applying a touch detection drive signal with a plurality of pulse waveforms for detecting an external object to the selected target electrodes to perform a scanning drive, wherein
  a scanning pitch in the scanning drive and a total width of the selected target electrodes are set independently of one another, such that:
    to increase a position resolution when a touched position is detected, the total width of the selected target electrodes is fixed, and the scanning pitch is set to be smaller than the total width of the selected target electrodes, and
    to increase a detection sensitivity to a touch, the scanning pitch is fixed, and the total width of the selected target electrodes is increased in a range in which the scanning pitch is smaller than the total width of the selected target electrodes,
  the scanning drive section sequentially selects the target electrodes by shifting the drive area by the scanning pitch so that the shifted drive area includes a part of the most recently selected target electrodes,
  the drive electrodes include a predetermined number of kinds of drive electrodes,
  the predetermined number of kinds of drive electrodes are alternatingly arranged side by side, and
  in the scanning drive, while the touch detection drive signal is simultaneously applied to one target electrode in addition to the predetermined number of target electrodes selected from the predetermined number of kinds of drive electrodes which are alternatingly arranged side by side, scanning is performed to shift the target electrodes by the predetermined number of target electrodes at a time.

2. The touch detector according to claim 1, further comprising:
  a touch detection section sampling a detection signal of the detection electrode at timings according to transitions of the pulse waveforms of the touch detection drive signal to detect an external object.

3. The touch detector according to claim 2, wherein
  when the scanning drive section drives the target electrodes, the touch detection section completes detection of an external object in a region corresponding to the driven target electrodes.

4. The touch detector according to claim 3, wherein the selected target electrodes have an equal width.

5. The touch detector according to claim 3, wherein
  the drive electrodes include the predetermined number of kinds of drive electrodes with different widths.

6. The touch detector according to claim 1, wherein
  the touch detection section determines the touched position based on all detection results obtained from the target electrodes sequentially selected.

7. The touch detector according to claim 1, further comprising a control section providing control signals, wherein
  the total width of the selected target electrodes and the scanning pitch are allowed to be independently controlled according to the control signals provided by the control section.

* * * * *